(12) United States Patent
Davies

(10) Patent No.: US 11,703,111 B2
(45) Date of Patent: Jul. 18, 2023

(54) BALL SCREW ASSEMBLY

(71) Applicant: Goodrich Actuation Systems Limited, West Midlands (GB)

(72) Inventor: Stephen Harlow Davies, Shrewsbury (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 0 days.

(21) Appl. No.: 17/745,170

(22) Filed: May 16, 2022

(65) Prior Publication Data

US 2022/0373065 A1    Nov. 24, 2022

(30) Foreign Application Priority Data

May 24, 2021   (EP) .................................. 21275061

(51) Int. Cl.
*F16H 25/22* (2006.01)
*F16H 25/24* (2006.01)

(52) U.S. Cl.
CPC ..... *F16H 25/2214* (2013.01); *F16H 25/2472* (2013.01)

(58) Field of Classification Search
CPC .. F16H 25/2214; F16H 25/2472; F16H 35/10; F16H 2035/13; F16H 2035/106; F16H 25/2009; F16H 25/2021
See application file for complete search history.

(56) References Cited

U.S. PATENT DOCUMENTS

| | | | |
|---|---|---|---|
| 4,795,172 A | 1/1989 | Brande | |
| 4,821,592 A * | 4/1989 | Rousselot | F16H 25/2233 74/424.9 |
| 8,267,656 B2 * | 9/2012 | Carvalho | B64C 11/385 416/165 |
| 2003/0029258 A1 * | 2/2003 | Davies | F16H 25/2472 74/424.81 |

(Continued)

FOREIGN PATENT DOCUMENTS

| | | |
|---|---|---|
| EP | 1283384 A2 | 2/2003 |
| EP | 1283384 A3 | 8/2004 |
| EP | 1900970 A1 | 3/2008 |

OTHER PUBLICATIONS

European Search Report for Application No. 21275061.6, dated Oct. 20, 2021, 8 pages.

*Primary Examiner* — Zakaria Elahmadi
(74) *Attorney, Agent, or Firm* — Cantor Colburn LLP

(57) ABSTRACT

A ball screw assembly includes a screw shaft along which is formed a first helical groove; a nut along which is form a second helical groove; the first helical groove and the second helical groove cooperating to define a track, a plurality of balls arranged in the track and configured to move along the track in response to relative motion between the screw shaft and the nut such that rotational motion of the screw is translated to linear motion of the nut via the balls and vice versa. The assembly also includes a bypass shoe arranged between the nut and the track and spaced from the track by a predetermined preload X, wherein when a load applied to the nut exceeds the predetermined preload, the bypass shoe engages with the track such that motion of the screw is transferred to motion of the nut via the shoe and bypasses the balls.

6 Claims, 1 Drawing Sheet

(56) References Cited

U.S. PATENT DOCUMENTS

2009/0308192 A1* 12/2009 Lin .................... F16H 25/2247
74/424.81
2019/0101196 A1 4/2019 Lu et al.

* cited by examiner

BALL SCREW ASSEMBLY

CROSS REFERENCE TO RELATED APPLICATIONS

This application claims priority to European Patent Application No. 2175061.6 filed May 24, 2021, the entire contents of which is incorporated herein by reference.

TECHNICAL FIELD

The present disclosure relates to a ball screw assembly.

BACKGROUND

Ball screws are used in many applications for translating rotary motion e.g. from a motor, to linear motion for a load, or from thrust to torque, and vice versa. A ball screw assembly consists of a screw and a nut, each with matching helical grooves, and balls which roll between the grooves providing contact between the nut and the screw such that the balls transmit the load from the rotating part to the other part. As the screw or the nut rotates relative to the other part, the balls roll along the grooves causing linear motion of the other part. The nut is provided with a return path for the balls to recirculate.

The suitability of a particular ball screw to an application is determined, at least in part, by its load capacity. Ball bearing assemblies for ball screws have a static load rating which is the load that, when applied to the non-rotating ball, would result in a predetermined permanent deformation of the ball track set as 0.0001 Dw, where Dw is the ball diameter, as this is a degree of deformation that has been determined to be likely to cause damage to the ball screw components. When selecting a ball screw for a given application, the maximum load it is likely to experience must be determined and a design having a suitable static load rating will be selected.

The static load capacity is, according to industrial standards, a factor of the hardness of the ball track material.

Where it is known, therefore, that the force applied to the ball screw will be high, a ball screw having a sufficiently high static load capacity will need to be selected and this will generally require the tracks to be made of a hard material. Such materials are expensive.

In some applications, as will be discussed further below, such as in a Thrust Reverser Actuation System (TRAS) of an aircraft, ball screws are used to move the actuated surface. Whilst the force on the actuator is generally within a given range, in a failure event, this force can increase significantly. Although such events are rare or may never happen, the components of the actuator system have to be designed for such a worse-case scenario as these are safety critical systems. This means that a ball screw has to be selected that has a static load capacity appropriate to handle the high failure force although for the majority of the time a much lower, 'normal' force will be applied for which a ball screw with a much lower capacity would suffice. The ball screws having the failure-level capacity have to be made of very hard material to achieve that capacity and are, therefore, much more expensive that would be needed for normal operating conditions. Ball screws for aerospace applications are typically designed according to the industry standard—currently ISO 3408-1 which defines methods of determining operational life and static load capacity. The standard generally means that the same considerations are given to ball screw design across all aerospace applications so that e.g. ball screws in TRAS are designed using the same considerations as ball screws for primary flight controls etc. In reality, though, the requirements for these different applications are different and it is conceivable that e.g. TRAS ball screws could be designed with different considerations in mind.

There is a need for a ball screw assembly that can accommodate high forces if necessary without having to be designed with a material of sufficient hardness to achieve the static load capacity for such high forces, so as to reduce costs and design complexity for components in environments where the normal operating force is substantially less than an occasional high force e.g. a failure force, such as in a TRAS.

SUMMARY

The present disclosure provides a ball screw assembly that is designed to effectively reduce the required static load capacity of the ball screw components, thus allowing less hard materials to be used without compromising safety and effectiveness and whilst still ensuring suitable component lifetime.

According to one aspect, there is provided a ball screw assembly comprising: a screw shaft along which is formed a first helical groove; a nut along which is form a second helical groove; the first helical groove and the second helical groove cooperating to define a track; a plurality of balls arranged in the track and configured to move along the track in response to relative motion between the screw shaft and the nut such that rotational motion of the screw is translated to linear motion of the nut via the balls and vice versa; and further comprising: a bypass shoe arranged between the nut and the track and spaced from the track by a predetermined preload X, wherein when a load applied to the nut exceeds the predetermined preload, the bypass shoe engages with the track such that motion of the screw is transferred to motion of the nut via the shoe and bypasses the balls.

According to another aspect, there is provided a TRAS having such a ball screw assembly to move the actuated surface(s).

DETAILED DESCRIPTION

Figure 1A:
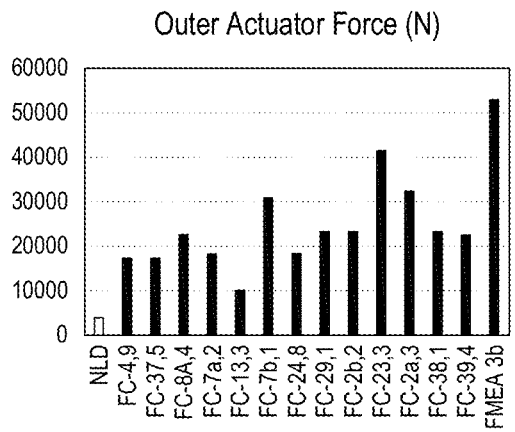
FIG. 1A shows, by way of background and example only, a load plot for the forces acting on a TRAS outer actuator.
Figure 1B:
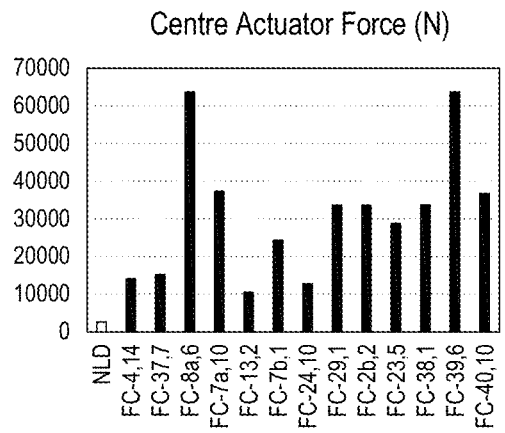
FIG. 1B shows, by way of background and example only, a load plot for the forces acting on a TRAS centre actuator.
Figure 1C:
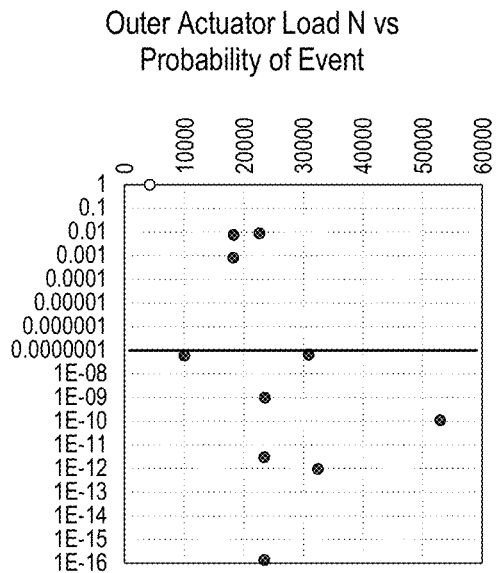
FIG. 1C shows, by way of background and example only, a load probability plot for the forces acting on a TRAS outer actuator.
Figure 1D:
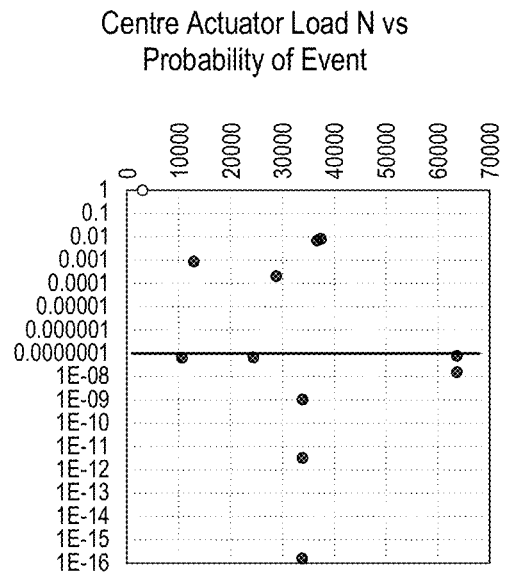
FIG. 1D shows, by way of background and example only, a load probability plot for the forces acting on a TRAS centre actuator.

With reference to FIGS. 1A-1D, and by way of background explanation only, it can be seen that only a very small part of the forces act on the actuator during the majority of the time of operation — i.e. during normal operation (represented as NLD—normal landing deployment). Therefore, for the majority of the time, the ball screw only needs to cope with a relatively small load acting on its components. High forces are rare. In the example shown, the NLD force is in the region of 4000N. The maximum failure load is around 13 times greater but rarely or never occurs.

Nevertheless, because these high forces can occur, the ball screw needs to be designed to cope with them if/when they do occur. For this reason, ball screws are designed with materials hard enough to provide the required static load capacity for such loads. Such materials, e.g. Chronidur 30™, or martensitic alloys with high chromium content are generally very expensive.

The life of the ball screw tracks is also an important design factor. In accordance with ISO 3408-1, the ball screw life with a 95% reliability, $L_5$, is derived using the following equation:

$$L_5 = (C_{dm}/P_{EQ})^3 \cdot f_r$$

Where:
$P_{EQ}$ is the equivalent load
$C_{dm}$=modified dynamic capacity
$f_r$=corrective factor for reliability (for 95% probability)
And $C_{dm} = f_k \cdot f_a \cdot f_m \cdot C_d$
Where:
$f_k$=(Track Hardness/654 Hv)$^2$
$f_a$=corrective factor for precision
$f_m$=corrective factor for material
$C_d$=dynamic capacity It can be seen, therefore, that the life of the ball screw is a function of the square of the hardness quotient.

Further, in accordance with ISO 3408-1, the static load capacity $C_{oam}$ of the ball screw is derived using the equation:

$$C_{oam} = C_{oa} \cdot f_{ho} \cdot f_a$$

Where $f_{ho}$=(Track Hardness/654 Hv)$^3$

Here, again, it can be seen that static load capacity is a function of the cube of the hardness quotient.

Using the current design strategy, it can be seen that track hardness is the dominant factor in the determination of both life and static load capacity and that ball screws are having to be made of very hard, expensive materials for the rare event that a high failure force occurs and that less hard and, thus, less expensive materials would provide sufficient static load capacity and adequate life for the majority of operation.

The solution provided by this disclosure allows ball screws to be used in these same applications but to be made using less hard, less expensive materials and lower production costs.

The ball screw according to this disclosure is designed such that a static load that exceeds a predetermined threshold, based on the normal operating dynamic loads with an error margin factored in, effectively bypasses the ball track so that the ball screw tracks and balls only need to be designed to handle static loads up to the predetermined threshold.

In an example, the predetermined threshold might be, say, 1.2 times the maximum normal operating dynamic load, rather than the conventional 13 or so factor mentioned above. This design would enable a significant reduction in track hardness requirements.

Furthermore, depending on the application, the target life margin of safety can be less than is currently designed for, since not all ball screw applications will require the margins that are currently built into the design of all ball screws. In aerospace applications, for example, TRAS actuators do not require the high life margins that are currently designed into ball screws for e.g. primary control actuator ball screws.

From an endurance life perspective, according to this disclosure, it is possible to specify an appropriate life margin of safety for the particular application and, from that, derive the minimum hardness requirement to achieve that margin, from the equations above.

Because the assembly of this disclosure incorporates a bypass function for higher loads, the wear on the components will be less and this bears on the required life margins and calculations.

The bypass function according to this disclosure will now be described in more detail with reference to FIGS. 2 and 3.

The bypass function is provided, according to the disclosure, by introducing a pre-loading system between the ball screw nut cartridge and where the cartridge attaches to an actuator.

Figure 2:
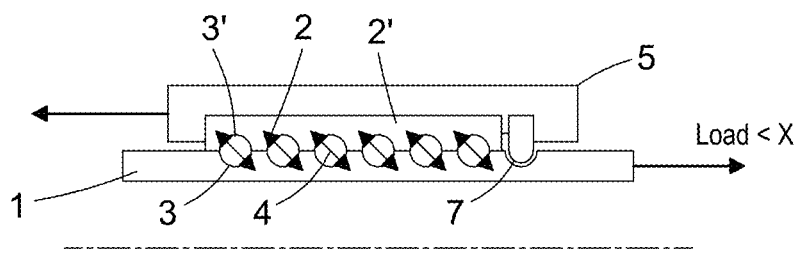
FIG. 2 is a side schematic view of a ball screw assembly according to the disclosure under normal load conditions.

With reference to FIG. 2, a ball screw arrangement is shown under normal load operating conditions.

As in conventional systems, the ball screw comprises a screw or shaft 1 and a nut 2. The nut 2 and the screw shaft 1 are provided with opposing helical grooves or turns 3, 3' acting as a ball track for balls 4 arranged therein. Rotation of the screw 1 relative to the nut 2 causes the balls 4 to move along the helical grooves which drives the nut axially or linearly along the screw. The nut includes a cartridge through which the balls 4 return to the start of the grooves. The nut cartridge 2' is provided with an attachment housing 5 that attaches to the load to be moved e.g. to an actuator (not shown). A load is applied to the ball screw by the actuator.

To provide the load bypass function when the load exceeds a predetermined threshold X, a bypass shoe 6 is provided between the nut housing 5 and the nut 2. The bypass shoe 6 sits in the groove 3 of the screw 1 with a small clearance 7 of e.g. approximately 0.10 mm. The nut 2 is preloaded to the housing 5 at the load X. X is selected to include the maximum normal operating load plus a predetermined margin. X may be e.g. 1.2 times the maximum normal operating load.

Thus, during normal operation, so long as the load does not exceed X—i.e. for all normally occurring dynamic loads—the bypass shoe 7 is spaced from the screw groove and torque is transmitted from the screw 1 to the nut 2 via the balls 4 in the usual way.

Figure 3:
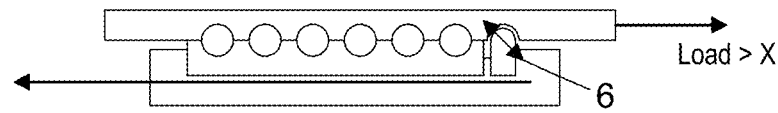
FIG. 3 is a side schematic view of a ball screw assembly according to the disclosure under high load conditions.

If, however, the load exceeds value X, as shown in FIG. 3, the nut overcomes the preload and moves such that the shoe 7 engages with the groove 3 in the screw. The application of the load exceeding value X is then transferred to the nut housing 5 via the bypass show 7, thus bypassing the balls 4.

The bypass function can be designed to be either uni-directional or bi-directional.

As well as meaning that the ball screw components do not need to be designed with capacity for excessive failure loads, so that less hard materials e.g. AMS 5659 (15-5 PH) can be used, the bypass feature has an additional benefit. The bypass function effectively converts the ball screw into a lead screw when the threshold load is exceeded. At this stage, the drive efficiency of the actuator is reduced which means that conventional mechanical load limiters are not required. This also contributes to reducing cost, size and weight of the assembly.

As well as being less expensive, the less hard materials mean that the ball screw tracks can be formed by simple turning operations rather than requiring special grinding processes.

As an alternative to taking the opportunity to use less hard materials, the by-pass function could also be used to reduce the number of balls in the ball screw, which has the effect of increasing efficiency as well as reducing costs.

The bypass function has particular benefits in relation to TRAS applications, but the design of this disclosure is not limited to such applications and can provide advantages in many ball screw applications.

The invention claimed is:

1. A ball screw assembly comprising:
   a screw shaft along which is formed a first helical groove;
   a nut cartridge (2') in which the nut is housed, and wherein the nut cartridge is provided with means for attachment to a load to be moved by the assembly;
   a nut along which is form a second helical groove;
   the first helical groove and the second helical groove cooperating to define a track;
   a plurality of balls arranged in the track and configured to move along the track from a first end to a second end of the track in response to relative motion between the screw shaft and the nut such that rotational motion of the screw is translated to linear motion of the nut via the balls and vice versa, wherein the balls return from the second end of the track to the first end via a ball return channel in the nut cartridge; and
   a bypass shoe arranged between the nut cartridge and the nut and spaced from the track by a predetermined preload X selected as being equal to the maximum normal operating dynamic load for the ball screw plus a predetermined error margin, wherein when a load applied to the nut does not exceed the predetermined preload X, torque is transmitted from the screw shaft to the nut via the balls, and wherein when a load is applied to the nut that exceeds the predetermined preload, the bypass shoe engages with the track such that motion of the screw is transferred to motion of the nut via the shoe and bypasses the balls.

2. The assembly of claim 1, wherein the bypass shoe is spaced from the track by a distance in the order of 0.1 to 0.5 mm.

3. The assembly of claim 1, wherein the bypass shoe is responsive to relative motion in a single direction.

4. The assembly of claim 1, wherein the bypass shoe is responsive to relative motion in two directions.

5. The assembly of claim 1, wherein the first and second helical grooves are made of AMS 5659 (15-5 PH).

6. A Thrust Reverser Actuation System, TRAS, comprising:
   a surface to be actuated; and
   an actuator comprising:
   a ball screw assembly as claimed in claim 1, arranged to move the surface responsive to the relative motion between the screw shaft and the nut.

* * * * *